United States Patent [19]

Peacock et al.

[11] Patent Number: 4,924,846
[45] Date of Patent: May 15, 1990

[54] DECORATOR BARBECUE GRILL WITH FABRIC PANEL ASSEMBLY

[75] Inventors: Dale Peacock; Doyle Raymer, both of Freeport, Ill.

[73] Assignee: The Thermos Company, Inc., Freeport, Ill.

[21] Appl. No.: 406,149

[22] Filed: Sep. 12, 1989

[51] Int. Cl.⁵ .......................... A47J 37/00; F24C 3/00
[52] U.S. Cl. .................................. 126/41 R; 126/268; D34/20; D34/21; 52/222; 52/273
[58] Field of Search ............... 126/41 R, 39 R, 25 R, 126/9 R, 37 R, 37 A, 50, 268, 545, 190, 39 C; D34/17, 20, 21; 160/369, 371, 392, 395; 49/501; 52/222, 586, 390, 273; 99/340, 447, 339

[56] References Cited

U.S. PATENT DOCUMENTS

| 3,576,141 | 3/1986 | Lillard | 126/547 |
|---|---|---|---|
| 3,757,479 | 9/1973 | Martinez | 52/222 |
| 3,866,016 | 2/1975 | Tombu | 52/222 |
| 3,915,146 | 10/1975 | Bauer | 126/41 R |
| 3,938,493 | 2/1976 | Bauer | 126/41 R |
| 3,964,463 | 6/1976 | Dailey | 126/41 R |
| 4,053,008 | 10/1977 | Baslow | 52/273 |
| 4,321,857 | 3/1982 | Best | 126/41 R |
| 4,341,255 | 7/1982 | Mock | 160/369 |
| 4,718,399 | 1/1988 | Shepherd | 126/268 |

Primary Examiner—James C. Yeung
Attorney, Agent, or Firm—Harness, Dickey & Pierce

[57] ABSTRACT

The barbecue grill has a fabric-covered panel for concealing the fuel container. The fabric is stretched across a frame and held in place by pressing the fabric into a longitudinally extending groove to form a convolution in the fabric into which a spline is pressed to hold the fabric in place. By removal of the spline, the fabric panel can be removed and replaced to allow the user to decoratively coordinate the appearance of the barbecue grill with outdoor lawn furniture or the like.

7 Claims, 3 Drawing Sheets

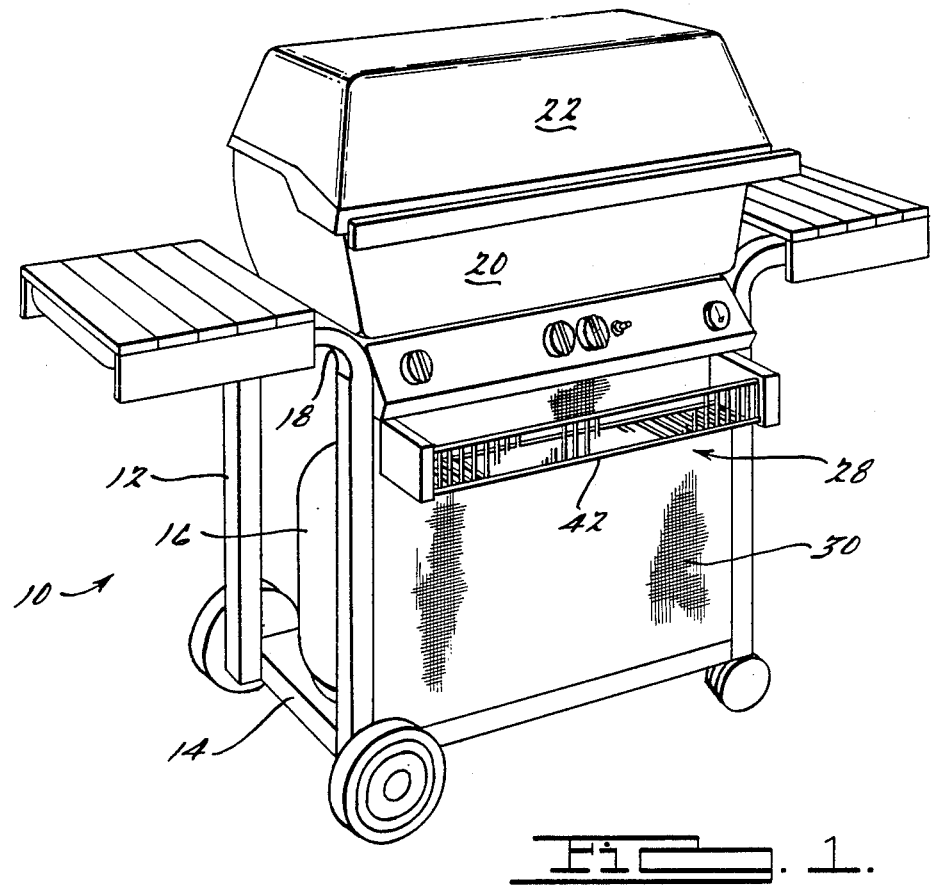
FIG. 1.
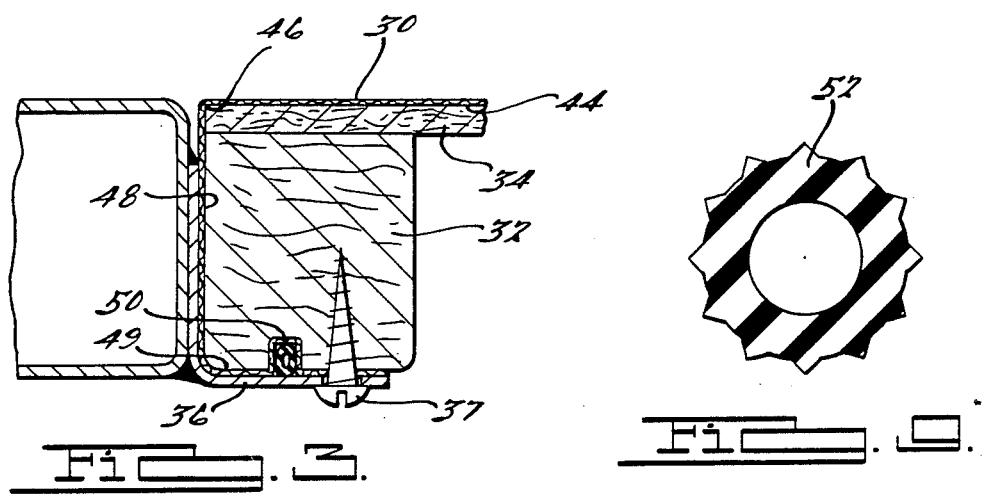
FIG. 3.
FIG. 5.

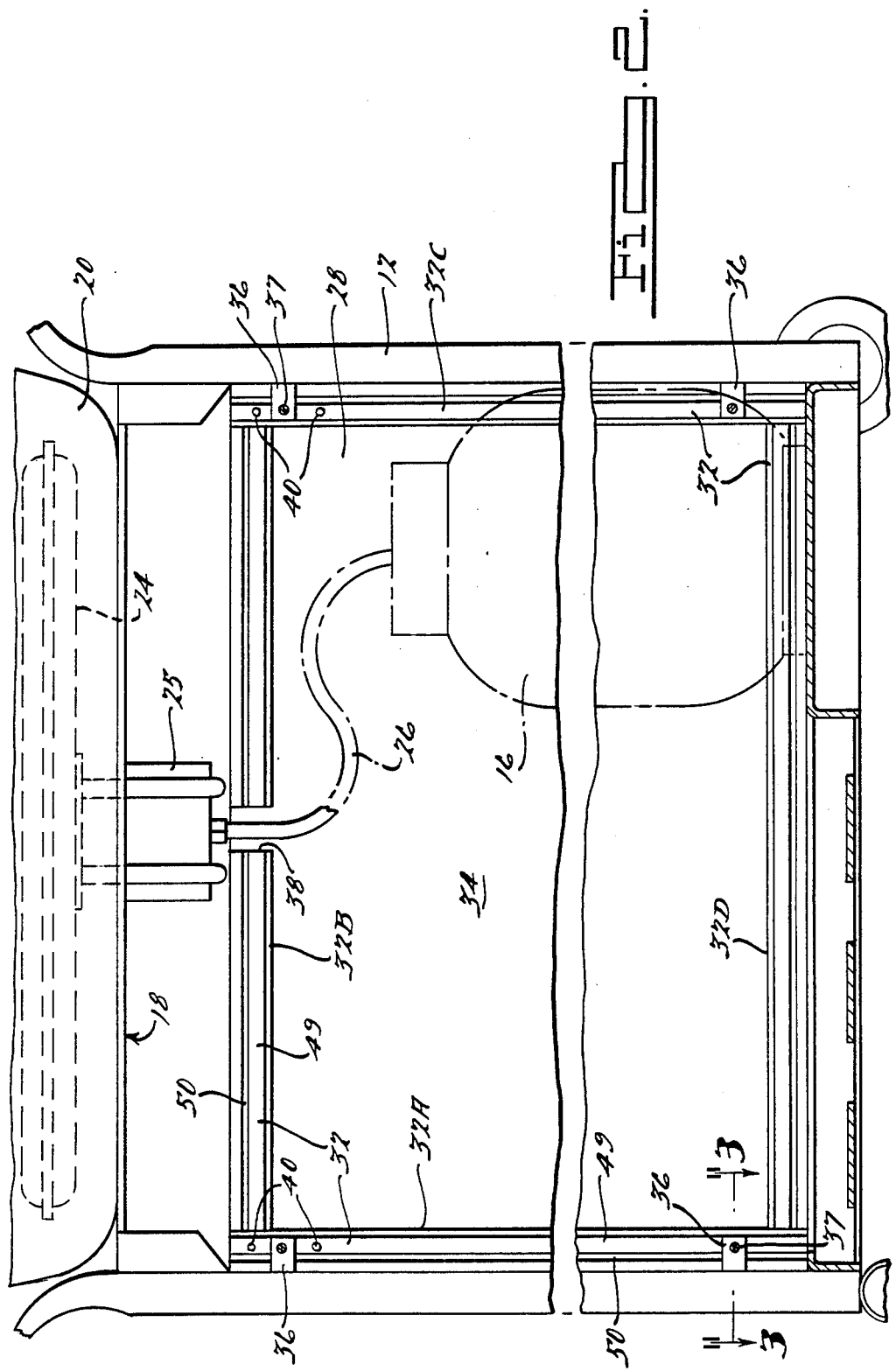

DECORATOR BARBECUE GRILL WITH FABRIC PANEL ASSEMBLY

BACKGROUND AND SUMMARY OF THE INVENTION

The present invention relates generally to barbecue grills and more particularly to an outdoor gas barbecue grill having a readily replaceable fabric panel assembly to coordinate with outdoor furniture.

Traditionally, gas barbecue grills have comprised a tubular metal frame which supports the barbecue grill containment casting and the fuel container. The containment casting typically encloses a burner assembly which is connected to the fuel container located beneath the casting.

Gas barbecue grills of this type are conventionally mass produced in a single color or limited range of color schemes. There has heretofore been no practical way of color coordinating the barbecue grill with the owner's outdoor lawn furniture.

The present invention provides a convenient means for coordinating the appearance of the barbecue grill with virtually any type of outdoor furniture. One advantage of the invention is its ease of use. The user, without special tools, can readily change the appearance of the barbecue grill to match virtually any color scheme or fabric pattern. The decorator barbecue grill includes a stand having a lower mounting portion and an upper mounting portion. The burner housing structure is disposed on the upper mounting portion, with a burner disposed therein. The fuel container is disposed on the lower mounting portion and is coupled to the burner to supply fuel to the burner for combustion.

In accordance with the invention a panel, supported by the stand, is positioned to at least partially conceal the fuel container. The panel comprises a generally rectangular frame having a first face which defines an exterior edge and having a second face which has a longitudinally extending groove therein. A fabric is stretched across the first face of the frame and around the exterior edge. A portion of the fabric overlies the second face and is pressed into the longitudinally extending groove to define a convolution in the fabric. A resilient tubular spline is pressed into the convolution to thereby hold the fabric on the frame. The tubular spline is readily removable by the user, permitting the fabric to be removed and replaced with any suitable woven or nonwoven sheet material selected to suit the user's decorating requirements. For a more complete understanding of the invention, its objects and advantages, reference may be had to the following specification and to the accompanying drawings.

BRIEF DESCRIPTION OF THE DRAWINGS

FIG. 1 is a perspective view of the decorator barbecue grill in accordance with the invention;

FIG. 2 is a vertical cross-sectional view illustrating the rear side of the panel;

FIG. 3 is a cross-sectional view taken substantially along the line 3—3 of FIG. 2, illustrating the preferred attachment bracket;

FIG. 9 is a cross-sectional view of the spline used in the preferred embodiment.

DESCRIPTION OF THE PREFERRED EMBODIMENT

Figure 4:
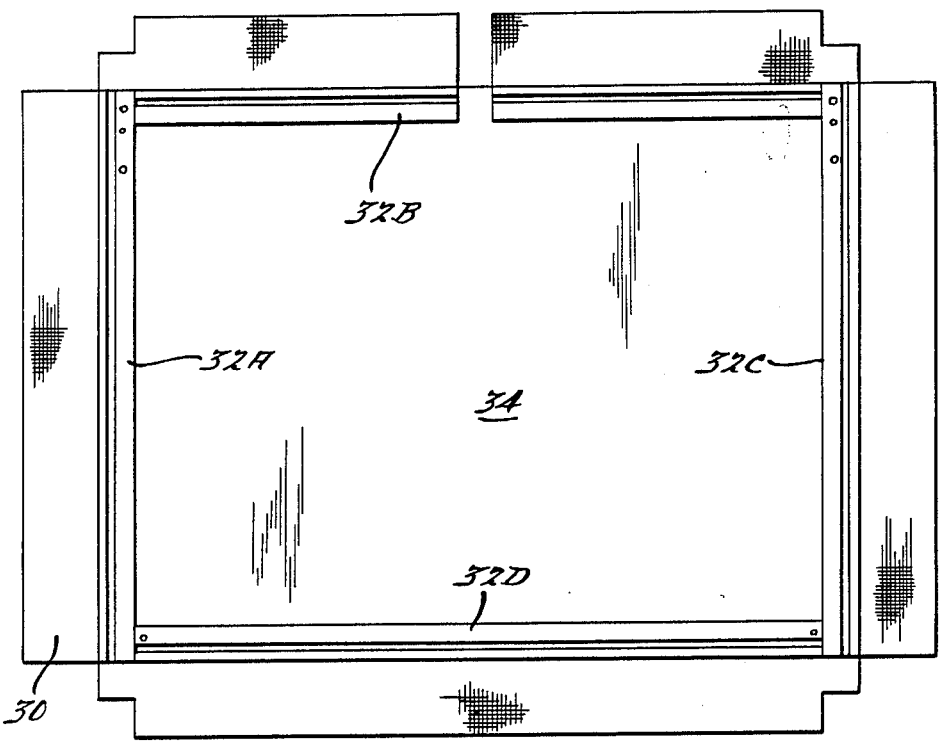
FIG. 4 is a plan view showing the fabric pattern with presently preferred frame positioned on top.
Figure 6:
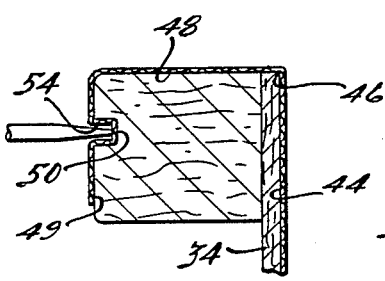
FIGS. 5 through 8, inclusive, illustrate the method of fabric panel assembly according to the invention.
Figure 5:
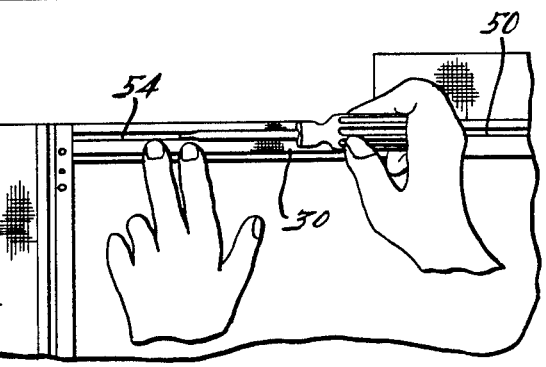
Figure 8:
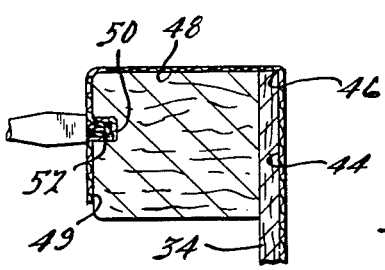
Figure 7:
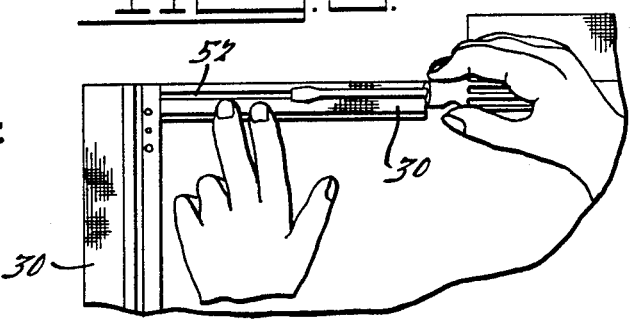

Referring to FIG. 1, the barbecue grill is illustrated generally at 10. As illustrated, the grill includes a stand 12 comprising a bent tubular frame of generally rectangular hollow cross-section. The stand defines a lower mounting portion 14 upon which the fuel container 16 is disposed. The stand also comprises an upper mounting portion 18 which supports the burner containment casting 20. The containment casting has a hinged top 22 and encloses a burner assembly 24 (not seen in FIG. 1 but shown in phantom in FIG. 2). The burner assembly with the associated valve structure 25 is connected by tubular conduit 26 to the fuel container 16, generally as illustrated in FIG. 2. Positioned in front of the fuel container to conceal the fuel container from frontal view is a panel assembly 28. The panel assembly includes a fabric stretched across the front thereof to provide a decorative appearance. As used herein, the word "fabric" is intended to encompass both woven and nonwoven materials, of either natural or manmade substance.

With reference to FIG. 2, the panel 28 comprises a generally rectangular frame 32 which is disposed about the perimeter of a generally rectangular planar member 34. The frame may be fabricated of wood or other suitable material and the planar member may be a compressed particle board or the like. The frame and planar member are preferably secured together using staples and/or adhesive (not shown). Angle brackets 36 are used to secure the frame to the stand 12 as with screws 37 (see FIG. 3).

The frame 32 is preferably constructed of four individual frame sections 32A, 32B, 32C and 32D. The upper frame section 32B includes a cutout 38 which provides clearance for the fuel conduit 26. Frame sections 32A and 32C are provided with pilot holes 40 which may be used to secure the condiment rack 42 (FIG. 1) to the front of panel 28 as with elongated bolts.

Frame 32 is covered by fabric 30 (see FIG. 3), which may be selected to match a given decor for outdoor lawn furniture. Preferably, fabric 30 is cut to the shape illustrated by the pattern in FIG. 4 and is then stretched across the frame as follows. Fabric 30 is stretched across the first face 44 of frame 32, around the exterior edge 46 defined by the first face and around a perpendicular face 48 and then across the second face 49 so that a portion of the fabric overlies the longitudinally extending groove 50. A hollow spline 52, shown in cross section in FIG. 9, is pressed into the convolution 54 formed by the fabric when pressed into groove 50.

FIGS. 5, 6, 7 and 8 show the manner in which the fabric may be installed using a flat blade screw driver. As illustrated, the screw driver is first used with blade oriented parallel to the groove, to depress a portion of the fabric into the groove, forming a convolution 54 in the fabric. Next, the screw driver is used with blade oriented perpendicular to the groove to press the elongated spline 52 into the convolution, thereby holding the fabric in place. It will be appreciated that the spline can be removed to allow the fabric to be removed and replaced by a different fabric if desired. This operation can readily be performed by the barbecue grill owner and the fabric, once removed, can serve as a pattern for cutting a new piece.

The invention thus affords a decorator barbecue grill which allows the owner to easily change the appearance to match outdoor lawn furniture or to replace the fabric when soiled. While the invention has been described in connection with the presently preferred embodiment, it will be understood that certain modification and change can be adopted without departing from the spirit of the invention as set forth in the appended claims.

We claim:

1. A decorator barbecue grill comprising:
   a stand having a lower mounting portion and an upper mounting portion;
   a burner housing structure disposed on said upper mounting portion having a burner disposed therein;
   a fuel container disposed on said lower mounting portion and coupled to said burner for supplying fuel to said burner for combustion;
   a panel supported by said stand and positioned to at least partially conceal said fuel container;
   said panel comprising a generally rectangular frame having a first face and a second face, said first face defining an exterior edge and said second face having a longitudinally extending groove;
   a fabric stretched across said first face of said frame and around said exterior edge, a portion of said fabric overlying said second face and pressed into said longitudinally extending groove to define a convolution of said fabric;
   a resilient tubular spline pressed into said convolution to thereby hold said fabric on said frame.

2. The barbecue grill of claim 1 wherein said fabric is a woven material.

3. The barbecue grill of claim 1 wherein said fabric is a nonwoven sheet of material.

4. The barbecue grill of claim 1 wherein said fabric is a plastic material.

5. The barbecue grill of claim 1 wherein said spline is removably pressed into said convolution to permit said panel to be removed and replaced.

6. The barbecue grill of claim 1 wherein said burner and said fuel container are connected by tubular conduit and wherein said frame has a cutout portion to provide clearance for said conduit.

7. The barbecue grill of claim 1 wherein said frame further comprises rigid substantially rectangular planar member and wherein said fabric covers said planar member.

* * * * *